United States Patent [19]
Odom

[11] 3,871,706
[45] Mar. 18, 1975

[54] SELF-CONTAINED DEMOUNTABLE DUMP BED
[76] Inventor: Donald M. Odom, Verbena Rt. 3, Meridian, Idaho 83642
[22] Filed: Apr. 8, 1974
[21] Appl. No.: 458,616

[52] U.S. Cl. ............................. 298/1 A, 298/22 J
[51] Int. Cl. ............................................. B60p 1/16
[58] Field of Search ...... 298/17 R, 1 A, 22 R, 22 C, 298/22 D, 22 J; 214/501, 502

[56] References Cited
UNITED STATES PATENTS
2,358,224  9/1944  Golay ............................ 298/1 A X
2,684,864  7/1954  Anthony ........................ 298/1 A X
2,849,255  8/1958  Pasker ............................ 298/22 J
3,740,097  6/1973  Parker et al. ..................... 298/1 A Primary Examiner—Frank E. Werner
Attorney, Agent, or Firm—John W. Kraft; Charles L. Kraft

[57] ABSTRACT
The demountable dump bed for truck vehicles having fixed load bodies comprises a support frame, a tilt body pivotally mounted to the support frame and a lift assembly having lift scissors, a hydraulic cylinder connected to the lift cylinders whereby leverage of the cylinder on the tilt body is increased, an hydraulic pump and a valve.

3 Claims, 2 Drawing Figures

SELF-CONTAINED DEMOUNTABLE DUMP BED

FIELD OF INVENTION:

The present invention relates to tilt load bodies for truck vehicles and more particularly to a demounted, hydraulic load body.

BACKGROUND OF THE INVENTION:

It has long been recognized that with fixed load bodies, such as with the box of a pick-up truck, that would be of particular advantage to provide a demounted hydraulic action with tilt load body. The prior art has been concluded from such design by absence of said means for easily mounting the tilt load body in the fixed load body, and by the lack of lift means which are both powerful and compact. With the lighter problem, an hydraulic or nomadic cylinder can not be over sized because of limitation of space and of the capacity of the pressure supply.

Accordingly it is an object of the present invention to provide a demountable hydraulically actuated tilt load body for truck-type vehicles.

It is a primary object of this invention to provide the foresaid demounted tilt load body for insertion into fixed load bodies such as the box of a pick-up truck.

These and other objects shall become apparent from the description following, it being understood that modifications may be made without affecting the teachings of the invention here set out.

SUMMARY OF THE INVENTION:

The demountable dump bed for truck vehicles having fixed load bodies comprises a support frame, a tilt body pivotally mounted to the support frame and a lift assembly having lift scissors, a hydraulic cylinder connected to the lift cylinders whereby leverage of the cylinder on the tilt body is increased, an hydraulic pump and a valve.

A more thorough and comprehensive understanding may be had from the detailed description of the preferred embodiment when read in connection with the drawings forming a part of this specification.

Figure 1:
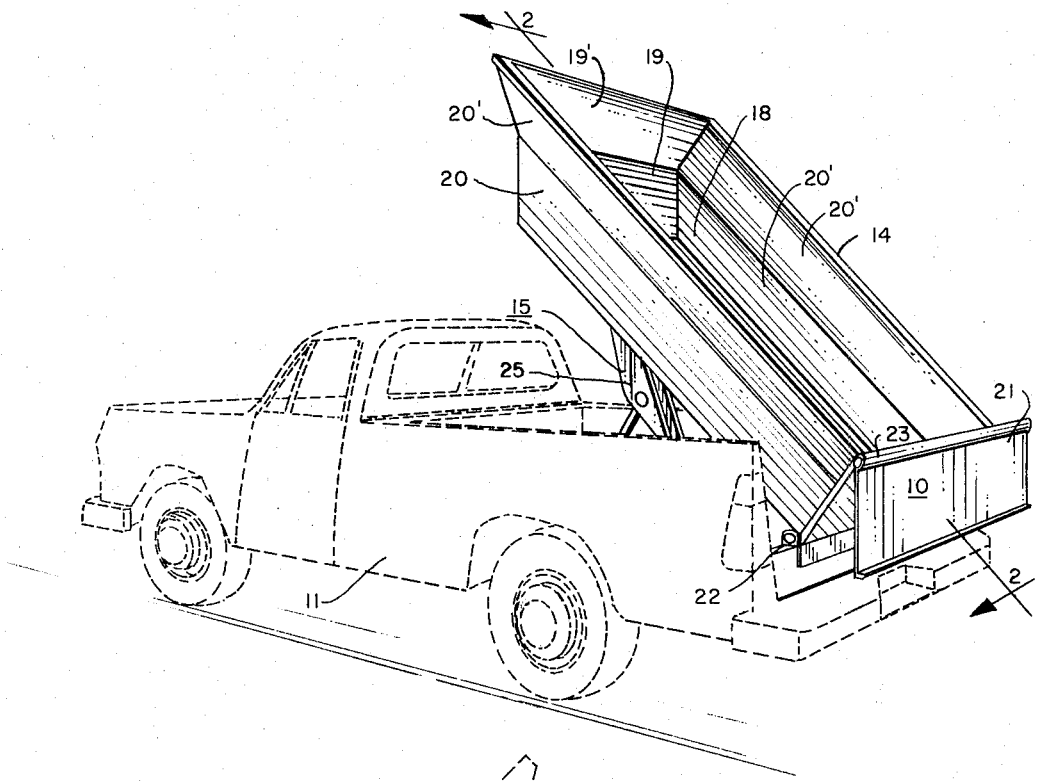
FIG. 1 is a left rear perspective view of the demountable dump bed shown in the raised position and shown mounted on a pick-up truck shown in broken lines for illustrative purposes.

DETAILED DESCRIPTION OF THE PREFERRED EMBODIMENT:

Referring now to the drawings and more particularly to the FIG. 1, the demountable dump bed of this invention is shown to advantage and generally identified by the numeral 10. The demountable dump bed 10 is intended to be carried on the truck 11. More particularly, the demountable dump bed 10 rides in the box 12 of the pick-up truck 11. The dump bed 10 comprises a support frame 13, a tilt body 14, and a lift assembly 15.

Figure 2:
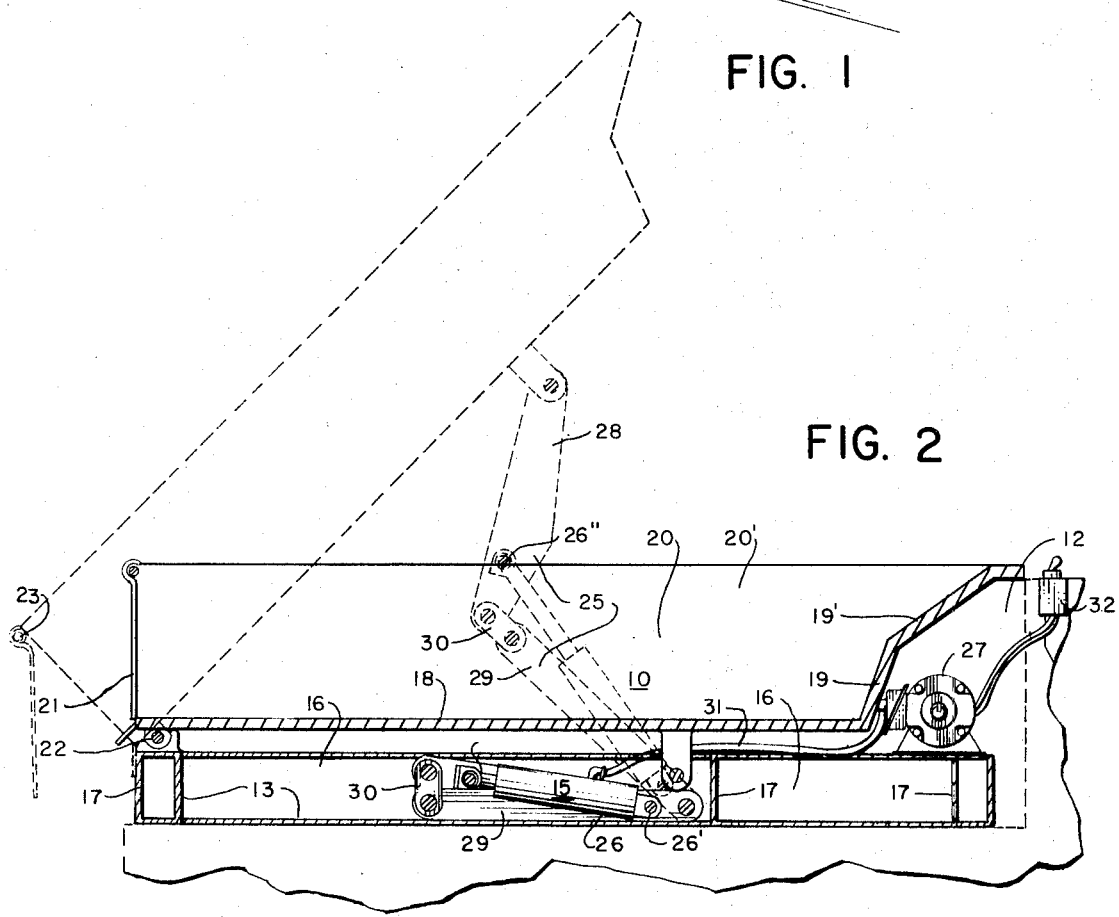
FIG. 2 is a cross-sectional view of the present demountable dump bed taken along the lines 2—2 of the FIG. 1 shown in the raised position and shown with the pick-up truck box in broken lines both for illustrative purposes.

As shown to advantage in the FIG. 2, the support frame 13 includes a pair of rectilinearly disposed rail beams 16 which carry the main load of the dump bed 10, and a plurality of transverse cross ties 17 which distally space the rails 16. The distance between the rails 16 is distally narrower than the interior transverse dimension of the truck body box 12. It is the dead-weight of the dump bed 10 which is primarily responsible for retaining the dump bed 10 in the truck box 12. Accordingly, it is of advantage to provide frictional retaining means on the side of the frame 13 contacting the box 12. Of course, compression clamps (not shown) may be added where appropriate.

The tilt body 14 is a substantially rectangular enclosure having a bottom wall 18 being nominally smaller than a standard truck box 12, a front wall 19 which issues upwardly from the forwardmost terminal end of the bottom wall 18, a pair of side walls 20 issuing upwardly from the sides of the bottom wall 18 and being joined to the front wall 19, and a hingedly mounted tail gate 21 disposed at the rearwardmost terminal end of the body 14. The tilt body 14 is pivoted at the rearwardmost terminal end of the bottom wall 18 and the frame 13 on a bearing 22. It has been found that this structure of the tilt body 14 is sufficiently rigid with the walls 18, 19 and 20 fabricated of only sheet materials of suitable gage. Top tilt body members 19' and 20' issue outwardly at an oblique angle from the uppermost terminal edges of the walls 19 and 20 to increase the capacity of the tilt body 14 and to protect the truck box 12. The tail gate 21 is mounted at its uppermost terminal edge with suitable mounting hinges 23 which are also fastened at the uppermost, rearward terminal ends of the side walls 20. The tailgate 21 may be provided with locks (not shown) which secure the tailgate 21 to the rearwardmost terminal ends of the side walls 20 and bottom wall 18.

The lift assembly 15 includes lift scissors 25, a pressure cylinder 26 and a pump 27. The lift scissors 25 comprise a first lever 28 pivotally mounted centrally distally from the forward wall 19 in the lowermost terminal side of the bottom wall 18, and issues rectilinearly and rearwardly therefrom, and a second lever 29 may be pivotally mounted to the rearwardmost terminal end of the first lever 28 and to a transverse cross tie 17 which is centrally disposed in the frame 13. It has been found to advantage to provide a connecting link 30 pivotally mounted between the rearwardmost terminal ends of the scissor levers 28 and 29. The link 30 may be of a predetermined length operable to assist the lift assembly 15 when ascending the tilt body 14 from its horizontal position. It may be seen that each of the levers 28 and 29 may be fabricated as parallelly disposed plates to provide suitable rigidity and low bearing capacity. The cylinder 26 is pivotally mounted at its base 26' to the transverse cross ties 17 having the second lever 29, and by the piston 26" pivotally mounted distally from the rearwardmost terminal end of the first lever 28. The pump 27 is mounted at the forwardmost terminal end of the support frame 13 and is connected to the cylinder 26 by conduits 31. It may be seen that the tilt body 14 may be fabricated distally shorter than the truck box 12, or a recess (not shown) may be fabricated in the front wall 19 and the bottom wall 18 to accommodate the pump 27. A valve or switch 32 is detachably mounted to the forward terminal end of the left side wall 12' of the truck box 12 to selectively control the lift assembly 25.

The demountable dump bed 10 is installed into the truck box 12 by sliding frame 13 into the truck box 12 until the forward wall 19 is distally disposed from the forwardmost wall of the box 12. The switch 32 is then mounted in position on the box 12. Further, the center of gravity of the tilt body 14 is sufficiently approximate to the center of gravity of the truck box 12 to retain the two in their operating depositions.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A demountable dump bed for truck vehicles having fixed box-type load bodies, comprising;
    a support frame comprising a pair of rectilinear rails and a plurality of transverse cross-ties;
    a tilt body pivotally mounted at its rearwardmost terminal end to the rearwardmost terminal end of said support frame, said tilt body comprising a bottom wall, a front wall issuing upwardly from the rearwardmost terminal end of said bottom wall, a pair of side walls issuing upwardly from the terminal side of said bottom wall and a tailgate pivotally mounted at its uppermost terminal end to the upwardmost rearwardmost terminal ends of said side walls and meeting with said bottom wall; and a lift assembly including lift scissors including a first lever pivotally mounted at one of its terminal ends and disposed rectilinearly with respect to said bottom wall, and a second lever pivotally mounted at one of its terminal ends to the free terminal end of said first lever and being connected by its terminal end opposite that connected to said first lever to a transverse cross-tie disposed centrally in said support frame, including a pressure cylinder pivotally connected at its base to said cross-tie having said lift scissors and being pivotally mounted at its piston head centrally in said first lever, and including a pressure pump mounted at the forwardmost terminal end of said support frame being accommodated by suitable configuration of said tilt body, said hydraulic pump having a valve detachably engageable with said truck box to control said cylinder.

2. The apparatus of claim 1 wherein said lift cylinder and said pump is hydraulic.

3. The apparatus of claim 1 including a top box issuing outwardly and at an oblique angle from the upwardmost terminal edges of said front wall and said side walls.

* * * * *